(12) United States Patent
Zou

(10) Patent No.: US 11,563,634 B2
(45) Date of Patent: *Jan. 24, 2023

(54) HARDWARE PLATFORM BASED ON FPGA PARTIAL RECONFIGURATION FOR WIRELESS COMMUNICATION DEVICE

(71) Applicant: Telefonaktiebolaget LM Ericsson (publ), Stockholm (SE)

(72) Inventor: Gang Zou, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/550,044

(22) Filed: Dec. 14, 2021

(65) Prior Publication Data

US 2022/0103426 A1 Mar. 31, 2022

Related U.S. Application Data

(63) Continuation of application No. 16/621,316, filed as application No. PCT/EP2017/064666 on Jun. 15, 2017, now Pat. No. 11,218,368.

(51) Int. Cl.
*H04L 41/0816* (2022.01)
*H04W 4/70* (2018.01)
*G06F 15/78* (2006.01)
*H04L 67/12* (2022.01)
*H04W 88/02* (2009.01)

(52) U.S. Cl.
CPC ...... *H04L 41/0816* (2013.01); *G06F 15/7871* (2013.01); *H04L 67/12* (2013.01); *H04W 4/70* (2018.02); *H04W 88/02* (2013.01)

(58) Field of Classification Search
CPC ...... H04L 41/0816; H04L 67/12; H04W 4/70; H04W 88/02; G06F 15/7871
See application file for complete search history.

(56) References Cited

U.S. PATENT DOCUMENTS 7,269,724 B1 9/2007 Trimberger et al.
7,583,725 B1 9/2009 Dick
(Continued)

FOREIGN PATENT DOCUMENTS

CN 1809012 A 7/2006
CN 102404723 A 4/2012
(Continued)

OTHER PUBLICATIONS

Author Unknown, "Reconfigurable computing," Wikipedia, the free encyclopedia, retrieved Dec. 6, 2019, URL: https://web.archive.org/web/20170508105935/https://en.wikipedia.org/wiki/Reconfigurable_computing, last updated May 5, 2017, 7 pages.
(Continued)

*Primary Examiner* — Blake J Rubin
(74) *Attorney, Agent, or Firm* — Withrow & Terranova, PLLC

(57) ABSTRACT

Systems and methods are disclosed herein that relate to partially reconfiguring a Field Programmable Gate Array (FPGA) of a wireless communication device to provide time-slicing of modem and application functionality. In this manner, a low-cost, small size, and low power consumption implementation of the FPGA and thus the wireless communication device is provided.

26 Claims, 4 Drawing Sheets

(56) References Cited

U.S. PATENT DOCUMENTS

| | | | |
|---|---|---|---|
| 8,476,926 | B1 | 7/2013 | Brunham et al. |
| 9,088,341 | B2 | 7/2015 | Hu et al. |
| 9,165,143 | B1* | 10/2015 | Sanders ............... G06F 21/575 |
| 9,208,357 | B1 | 12/2015 | Langhammer et al. |
| 9,594,723 | B2* | 3/2017 | Master ............... G06F 15/7867 |
| 10,303,648 | B1 | 5/2019 | Das et al. |
| 10,558,777 | B1* | 2/2020 | Yu ....................... G06F 30/394 |
| 10,642,630 | B1* | 5/2020 | Shaddock ........ H03K 19/17758 |
| 10,673,564 | B1 | 6/2020 | Walke et al. |
| 2001/0015919 | A1 | 8/2001 | Kean |
| 2005/0059427 | A1 | 3/2005 | Wallace |
| 2005/0066156 | A1 | 3/2005 | Moy et al. |
| 2014/0222521 | A1 | 8/2014 | Chait |
| 2015/0237058 | A1* | 8/2015 | Chritz ............... H04L 63/1416 726/23 |
| 2016/0088545 | A1 | 3/2016 | Ronneke et al. |
| 2016/0142974 | A1 | 5/2016 | Lindoff et al. |
| 2016/0299872 | A1 | 10/2016 | Vaidyanathan et al. |
| 2016/0323143 | A1 | 11/2016 | Kim et al. |
| 2017/0164417 | A1 | 6/2017 | Kress et al. |
| 2017/0357528 | A1 | 12/2017 | Puranik et al. |
| 2018/0054359 | A1* | 2/2018 | Abel ................... H04L 41/0806 |
| 2018/0077637 | A1 | 3/2018 | Basilier et al. |
| 2018/0084073 | A1 | 3/2018 | Walsh et al. |
| 2018/0095670 | A1 | 4/2018 | Davis et al. |
| 2018/0097690 | A1 | 4/2018 | Yocam et al. |
| 2018/0270894 | A1 | 9/2018 | Park et al. |
| 2018/0287869 | A1* | 10/2018 | Munafo ............. H04W 12/069 |
| 2018/0314808 | A1 | 11/2018 | Casey et al. |
| 2019/0174423 | A1 | 6/2019 | Zhang et al. |
| 2019/0268904 | A1 | 8/2019 | Miao et al. |
| 2019/0306124 | A1 | 10/2019 | Bild et al. |
| 2020/0233834 | A1* | 7/2020 | Falk ....................... G06F 21/71 |
| 2020/0272899 | A1 | 8/2020 | Dunne et al. |
| 2020/0342112 | A1 | 10/2020 | Plusquellic |
| 2020/0374205 | A1 | 11/2020 | Sharma et al. |
| 2022/0209868 | A1* | 6/2022 | Frankel ................. H04B 10/40 |

FOREIGN PATENT DOCUMENTS

| | | |
|---|---|---|
| CN | 102523275 A | 6/2012 |
| CN | 103067330 A | 4/2013 |
| EP | 2224782 A1 | 9/2010 |

OTHER PUBLICATIONS

Al Farisi, Brahim, et al., "Enabling FPGA routing configuration sharing in dynamic partial reconfiguration," Design Automation for Embedded Systems, vol. 19, Issue 1-2, Springer Science+Business Media, New York, Published online: Sep. 18, 2014, pp. 189-221.

Da Silva, Alexandre Ingles, et al., "Sram-Based FPGA Proposal for Dynamic Power Management on Sensor Node," 9th International Symposium on Reconfigurable and Communication-Centric Systems-on-Chip (ReCoSoC), IEEE, Montpellier, 2014, 7 pages.

Garcia, Rafael, et al., "Exploiting Partially Reconfigurable FPGAs for Situation-Based Reconfiguration in Wireless Sensor Networks," 17th IEEE Symposium on Field Programmable Custom Computing Machines, IEEE, Napa, CA, 2009, pp. 243-246.

Hsieh, Chih-Ming, et al., "A Reconfigurable Hardware Accelerated Platform for Clustered Wireless Sensor Networks," 18th International Conference on Parallel and Distributed Systems, IEEE, Singapore, 2012, pp. 498-505.

Hsieh, Chih-Ming, et al., "Hardware/Software Co-design for a Wireless Sensor Network Platform," International Conference on Hardware/Software Codesign and System Synthesis (CODES+ISSS), New Delhi, Oct. 2014, 10 pages.

Kumar, Arun K A, "FPGA Implementation of PSK Modems Using Partial Re-configuration for SDR and CR Applications," 2012 Annual IEEE India Conference (INDICON), Kochi, 2012, pp. 205-209.

Valverde, Juan, et al., "Using SRAM Based FPGAs for Power-Aware High Performance Wireless Sensor Networks," Sensors—Open Access Journal, Basel, Switzerland, vol. 12, Issue 3, URL: https://doi.org/10.3390/s120302667, published Feb. 28, 2012, pp. 2667-2692.

International Search Report and Written Opinion for International Patent Application No. PCT/EP2017/064666, dated Aug. 2, 2017, 12 pages.

Non-Final Office Action for U.S. Appl. No. 16/621,316, dated Oct. 29, 2020, 11 pages.

Final Office Action for U.S. Appl. No. 16/621,316, dated Mar. 9, 2021, 13 pages.

Advisory Action and Applicant-Initiated Interview Summary for U.S. Appl. No. 16/621,316, dated Jun. 29, 2021, 4 pages.

Notice of Allowance for U.S. Appl. No. 16/621,316, dated Sep. 2, 2021, 8 pages.

* cited by examiner

HARDWARE PLATFORM BASED ON FPGA PARTIAL RECONFIGURATION FOR WIRELESS COMMUNICATION DEVICE

This application is a continuation of U.S. patent application Ser. No. 16/621,316, filed Dec. 11, 2019, which is a 35 U.S.C. § 371 national phase filing of International Application No. PCT/EP2017/064666, filed Jun. 15, 2017, the disclosures of which are incorporated herein by reference in their entireties.

TECHNICAL FIELD

The present disclosure relates to a Field Programmable Gate Array (FPGA) hardware platform for a wireless communication device such as, e.g., a Machine Type Communication (MTC) device or Internet of Things (IoT) device.

BACKGROUND

By 2020, more than 50 billion devices are expected to be connected to the cloud in what is referred to as the Internet of Things (IoT). These devices in the IoT are referred to as IoT devices. To adapt different applications and radio access technologies, hardware and software implementation of IoT devices is required to be flexible. Due to its ability to be (re)programmed after manufacturing, a Field Programmable Gate Array (FPGA) is a good candidate for implementation of an IoT device. On the other hand, for most IoT devices, the cost, size, and power consumption are critical in order to deploy them on a great scale. However, designing a platform for an IoT device with low cost, small size, and low power consumption is challenging.

Chinese Patent Application Publication No. CN102523275 proposes an IoT access system based on an FPGA, particularly focusing on the system and hardware design. However, it fails to describe or mention any type of optimization of cost, area, and power consumption.

An FPGA is an integrated circuit that can be programmed or reprogrammed after manufacturing by a customer or designer. The FGPA is programmed using a Hardware Description Language (HDL). In particular, an HDL is used to define the behavior of the FPGA. Then, using an electronic design automation tool, a technology-mapped netlist is generated. The netlist is then fit to the FPGA architecture, usually using proprietary software of the FPGA manufacturer. Once design and validation is complete, the bit file, or binary file, generated by the proprietary software of the FPGA manufacturer is loaded into the FPGA via a serial interface or external memory. In this manner, the FPGA can be programmed or reprogrammed as desired.

Some FPGAs support partial reconfiguration. Partial reconfiguration of an FPGA refers to reconfiguring a portion of the reconfigurable hardware circuitry of the FPGA while the other part(s) of the reconfigurable hardware circuitry are still operating as previously programmed. In other words, partial reconfiguration allows some parts, or functionality, of the FPGA to continue operating while another part(s), or functionality, of the FPGA is reprogrammed. For example, if a data processing functionality implemented on an FPGA requires different types of algorithms for different types of input data, the functionality of the FPGA may be reconfigured as need while the rest of the FPGA continues to operate.

What is needed are systems and methods that leverage the flexibility of an FPGA to provide an IoT device with low cost, small size, and low power consumption.

SUMMARY

Systems and methods are disclosed herein that relate to partially reconfiguring a Field Programmable Gate Array (FPGA) of a wireless communication device to provide time-slicing of modem and application functionality. In some embodiments, a method for partially reconfiguring an FPGA that provides processing functionality for a wireless communication device comprises determining that a first triggering event for partially reconfiguring the FPGA to provide modem functionality has occurred, where the modem functionality is functionality related to transmitting and/or receiving signals via a Radio Frequency (RF) transmit and/or receive circuitry that is external to the FPGA. The method further comprises, upon determining that the first triggering event for partially reconfiguring the FPGA to provide modem functionality has occurred, loading a modem bit file into a reconfiguration partition of the FPGA, where the modem bit file programs the reconfiguration partition of the FPGA to provide the modem functionality. The method further comprises, after loading the modem bit file into the reconfiguration partition of the FPGA, determining that a second triggering event for partially reconfiguring the FPGA to provide application functionality, rather than the modem functionality, has occurred. The method further comprises, upon determining that the second triggering event for partially reconfiguring the FPGA to provide application functionality, rather than the modem functionality, has occurred, loading an application bit file into the reconfiguration partition of the FPGA, where the application bit file programs the reconfiguration partition of the FPGA to provide the application functionality. In this manner, time-slicing of the modem and application functionality is provided, which enables a low-cost, small size, and low power consumption implementation of the FPGA and thus the wireless communication device.

In some embodiments, the wireless communication device periodically transmits and/or receives signals via a wireless communication network, and the first triggering event is an event indicative of a start of a transmit and/or receive occasion of the wireless communication device. Further, in some embodiments, the second triggering event is an event indicative of completion of the transmit and/or receive occasion of the wireless communication device.

In some embodiments, the wireless communication device periodically transmits and/or receives signals via a wireless communication network, and the first triggering event is expiration of a timer having a duration equal to an amount of time between transmit and/or receive occasions for the wireless communication device. Further, in some embodiments, expiration of the timer is indicative of a start of a transmit and/or receive occasion of the wireless communication device, and the second triggering event is an event indicative of completion of the transmit and/or receive occasion of the wireless communication device.

In some embodiments, the application functionality comprises functionality to process signals received and stored by the FPGA while the reconfiguration partition was programmed to provide the modem functionality and/or functionality to collect data from one more sensors that are external to the FPGA.

In some embodiments, the method further comprises, upon determining that the first triggering event for partially reconfiguring the FPGA to provide modem functionality has occurred, enabling an interface on the FPGA that communicatively couples the reconfiguration partition of the FPGA to the RF transmit and/or receive circuitry. Further, in some embodiments, upon determining that the second triggering event for partially reconfiguring the FPGA to provide application functionality, rather than the modem functionality, has occurred, disabling the interface on the FPGA that communicatively couples the reconfiguration partition of the FPGA to the RF transmit and/or receive circuitry.

In some embodiments, the method further comprises, upon determining that the second triggering event for partially reconfiguring the FPGA to provide application functionality, rather than the modem functionality, has occurred, enabling an interface on the FPGA that communicatively couples the reconfiguration partition of the FPGA to one or more external sensors.

In some embodiments, the method further comprises, upon determining that the second triggering event for partially reconfiguring the FPGA to provide application functionality, rather than the modem functionality, has occurred, waiting a predefined amount of time prior to loading the application bit file into the reconfiguration partition of the FPGA.

In some embodiments, the method further comprises, prior to determining that the first triggering event for partially reconfiguring the FPGA to provide modem functionality has occurred, loading a main bit file into a main partition of the FPGA that programs the main partition of the FPGA to provide a processor, a timer, memory, an interface to the RF transmit and/or receive circuitry, and an interface to the one or more external sensors.

In some embodiments, the method is performed by one or more components of the FPGA.

In some embodiments, the method is performed by a controller that is external to the FPGA.

In some embodiments, a wireless communication device for operation in a wireless communication network comprises RF transmit and/or receive circuitry, one or more sensors, non-volatile memory storing a modem bit file and an application bit file, and an FPGA. A controller is operable to determine that a first triggering event for partially reconfiguring the FPGA to provide modem functionality has occurred, where the modem functionality is functionality related to transmitting and/or receiving signals via the RF transmit and/or receive circuitry. The controller is further operable to, upon determining that the first triggering event for partially reconfiguring the FPGA to provide modem functionality has occurred, load the modem bit file from the non-volatile memory into a reconfiguration partition of the FPGA, where the modem bit file programs the reconfiguration partition of the FPGA to provide the modem functionality. The controller is further operable to, after loading the modem bit file into the reconfiguration partition of the FPGA, determine that a second triggering event for partially reconfiguring the FPGA to provide application functionality, rather than the modem functionality, has occurred. The controller is further operable to, upon determining that the second triggering event for partially reconfiguring the FPGA to provide application functionality, rather than the modem functionality, has occurred, load the application bit file from the non-volatile memory into the reconfiguration partition of the FPGA, where the application bit file programs the reconfiguration partition of the FPGA to provide the application functionality.

In some embodiments, the non-volatile memory further stores a main bit file and the controller is further operable to, prior to determining that the first triggering event for partially reconfiguring the FPGA to provide modem functionality has occurred, load the main bit file into a main partition of the FPGA that programs the main partition of the FPGA to provide memory, an interface to the RF transmit and/or receive circuitry, and an interface to the one or more sensors.

In some embodiments, the controller is implemented within the FPGA.

In some embodiments, the controller is a component of the wireless communication device and is external to the FPGA.

In some embodiments, the wireless communication device periodically transmits and/or receives signals via the wireless communication network, and the first triggering event is an event indicative of a start of a transmit and/or receive occasion of the wireless communication device. Further, in some embodiments, the second triggering event is an event indicative of completion of the transmit and/or receive occasion of the wireless communication device.

In some embodiments, the wireless communication device periodically transmits and/or receives signals via the wireless communication network, and the first triggering event is expiration of a timer having a duration equal to an amount of time between transmit and/or receive occasions for the wireless communication device. Further, in some embodiments, expiration of the timer is indicative of a start of a transmit and/or receive occasion of the wireless communication device, and the second triggering event is an event indicative of completion of the transmit and/or receive occasion of the wireless communication device.

In some embodiments, the application functionality comprises functionality to process signals received and stored by the FPGA while the reconfiguration partition was programmed to provide the modem functionality and/or functionality to collect data from one more sensors that are external to the FPGA.

In some embodiments, the controller is further operable to, upon determining that the first triggering event for partially reconfiguring the FPGA to provide the modem functionality has occurred, enable the interface to the RF transmit and/or receive circuitry. Further, in some embodiments, the controller is further operable to, upon determining that the second triggering event for partially reconfiguring the FPGA to provide application functionality, rather than the modem functionality, has occurred, disable the interface to the RF transmit and/or receive circuitry.

In some embodiments, the controller is further operable to, upon determining that the second triggering event for partially reconfiguring the FPGA to provide application functionality, rather than the modem functionality, has occurred, enable the interface to the one or more sensors.

In some embodiments, the controller is further operable to, upon determining that the second triggering event for partially reconfiguring the FPGA to provide application functionality, rather than the modem functionality, has occurred, wait a predefined amount of time prior to loading the application bit file into the reconfiguration partition of the FPGA.

Those skilled in the art will appreciate the scope of the present disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Systems and methods are disclosed herein that provide a Field Programmable Gate Array (FPGA) based hardware platform for a wireless communication device (e.g., a Machine Type Communication (MTC) device such as, e.g., an Internet of Things (IoT) device). In particular, partial reconfiguration of the FPGA is applied to time-slice the FPGA to provide modem functionality and application functionality separately. As a result, the design can fit into a much smaller FPGA and a low-cost, small-size, and low power consumption wireless communication device can be achieved.

Figure 1:
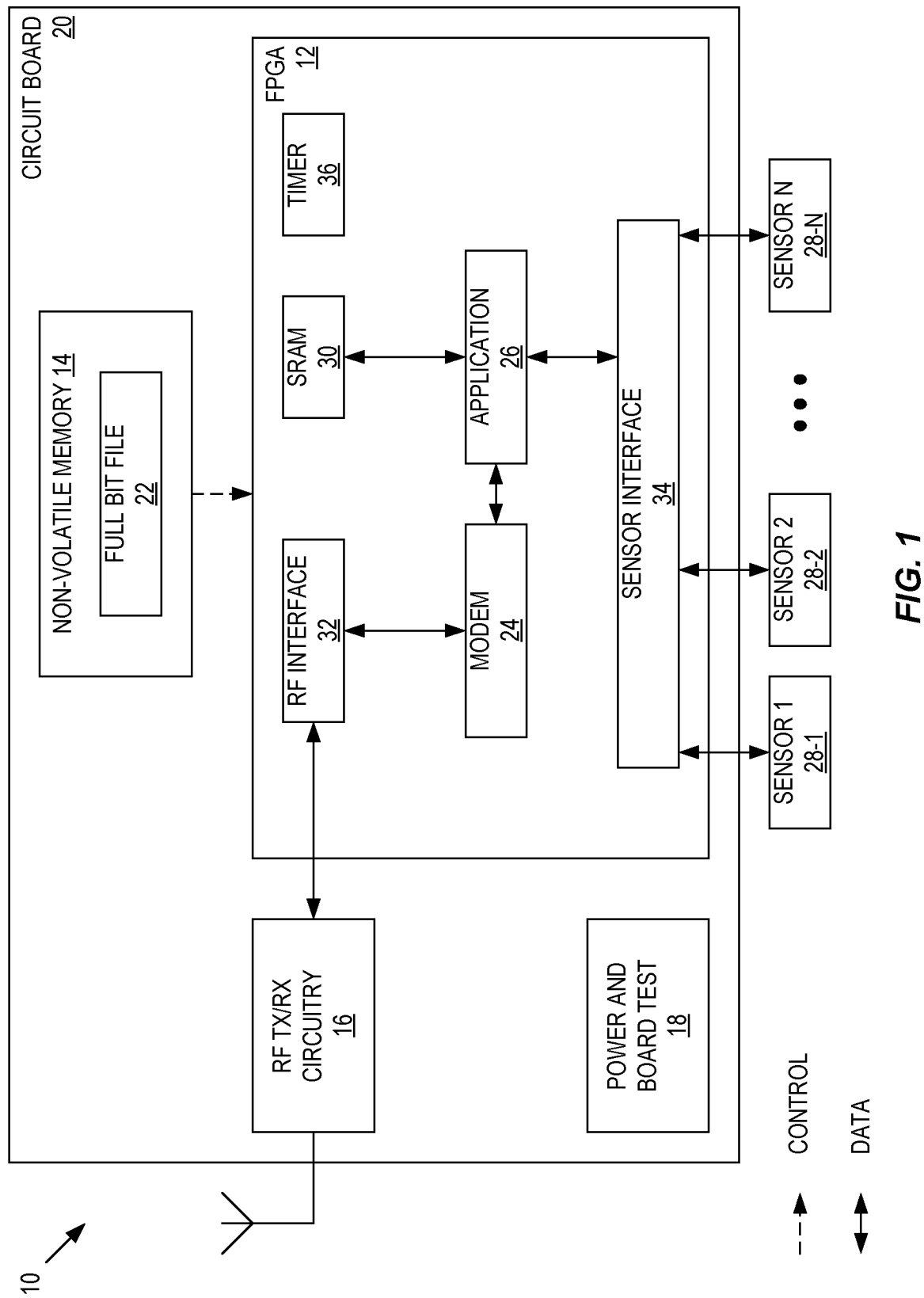
FIG. 1 illustrates a conventional Internet of Things (IoT) device using a Field Programmable Gate Array (FPGA) hardware platform.

Before describing embodiments of the present disclosure, a brief discussion of a conventional FPGA hardware platform for an IoT device is beneficial. As illustrated in FIG. 1, a conventional IoT device 10 using an FPGA hardware platform includes an FPGA 12, non-volatile memory 14, Radio Frequency (RF) transmit (TX) and/or receive (RX) circuitry 16, and a power and board test block 18 connected to a circuit board 20. A full bit file 22 is stored in the non-volatile memory 14 and loaded into the FPGA 12 via a controller on the FPGA 12 (not shown) or an external controller either on the circuit board 20 or external to the circuit board 20. The full bit file 22 is a binary file that, once loaded into the FPGA 12, programs the FPGA 12 to provide defined functionality. In this example, the full bit file 22 programs, or configures, the FPGA 12 to include:

a modem 24 that, e.g.,
  performs digital baseband processing (e.g., modulation) for signals transmitted via the RF TX and/or RX circuitry 16,
  performs digital baseband processing (e.g., demodulation) for signals received via the RF TX and/or RX circuitry 16,
  fetching data output by an application 26 and processing the data for, e.g., transmission via the RF TX and/or RX circuitry 16, and/or
  receive commands from, e.g., an IoT server or another IoT device(s) via the RF TX and/or RX circuitry 16 and process the received commands,
an application 26 that provides application-level functionality (e.g., data processing logic) such as, e.g.,
  collecting data from one or more sensors 28-1 through 28-N (generally referred to herein individually as sensor 28 and collectively as sensors 28) that are, in this example, external to the circuit board 20,
  storing the collected data in Static Random Access Memory (SRAM) 30,
  performing data compression for collected data,
  performing data cryptography for the collected data, and/or
  providing collected data to an external device, e.g., an external display,
an RF interface 32 that communicatively couples the modem 24 to the RF TX and/or RX circuitry 16,
a sensor interface 34 that communicatively couples the application 26 to the one or more sensors 28,
the SRAM 30 or other type of volatile memory that, e.g., stores data collected or otherwise output by the application 26, and
a timer 36 that is always on and schedules the RF sleep/wake switching so that the IoT device 10 can listen to the wireless communication network and transmit/receive data.

Note that both the modem 24 and the application 26 can be integrated into a single FPGA component.

In the example of FIG. 1, on power-up, the full bit file 22 is loaded into the FPGA 12. The may be done via a self-loading mechanism (i.e., the full bit file 22 is loaded by the FPGA 12 itself) or via an external controller (e.g., a controller in the power and board test block 18).

Figure 2:
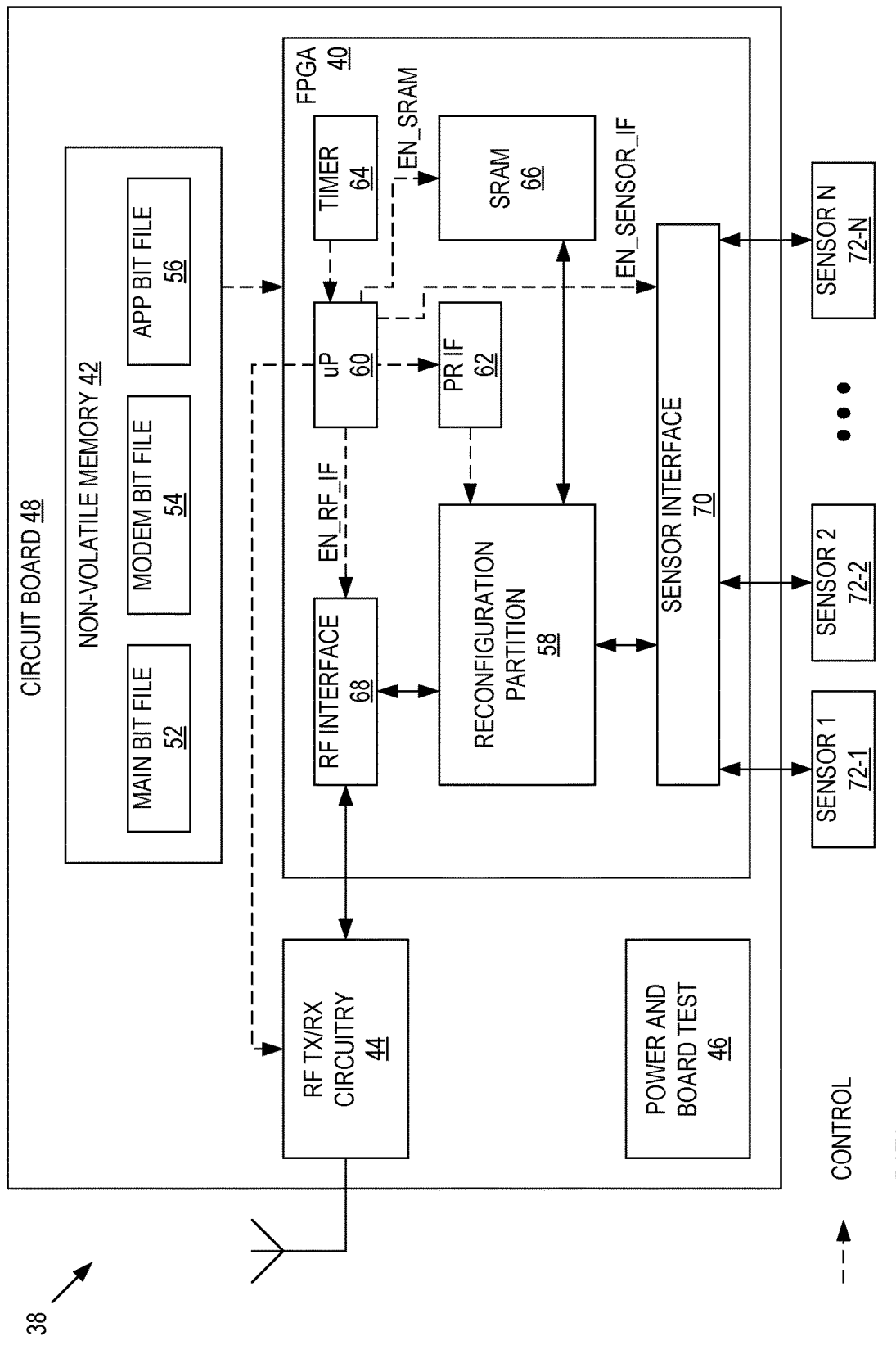
FIG. 2 illustrates a wireless communication device (e.g., a Machine Type Communication (MTC) device or IoT device) using an FPGA hardware platform that utilizes time-slicing of modem and application functionality via partial reconfiguration of the FPGA according to some embodiments of the present disclosure.

FIG. 2 illustrates a wireless communication device 38 using an FPGA hardware platform that utilizes time-slicing of modem and application functionality via partial reconfiguration of the FPGA according to some embodiments of the present disclosure. The wireless communication device 38 may be, e.g., an MTC device or more specifically an IoT device. The wireless communication device 38 is for operation in a wireless communication system such as, e.g., a cellular communications network such as, e.g., a Fifth Generation (5G) cellular communications network that supports, e.g., a narrowband IoT network.

As illustrated, the wireless communication device 38 includes an FPGA 40, non-volatile memory 42, RF TX and/or RX circuitry 44, and a power and board test block 46 connected to a circuit board 48. In order to support time-slicing of modem and application functionality via partial reconfiguration of the FPGA 40, a main bit file 52, a modem bit file 54, and an application (app) bit file 56 are stored in the non-volatile memory 42. Partial reconfiguration of the FPGA 40 allows parts of the FPGA 40 to be reconfigured, or reprogrammed, without interrupting other running parts of the FPGA 40. This enables specialized modules (i.e., a modem as defined by the modem bit file 54 and an application as defined by the application bit file 56) to be loaded on-demand at run time without occupying chip space when they are inactive.

The main bit file 52 is a binary file that, once loaded into the FPGA 40, configures a subset of the reconfigurable hardware resources (e.g., resources referred to herein as a main partition) to provide defined main or core functionality of the FPGA 40 that continues to operate even during partial reconfiguration. The modem bit file 54 and the application bit file 56 are separate binary files that, when loaded into a reconfiguration partition 58 of the FPGA 40, partially reconfigure the FPGA 40 such that the reconfiguration partition 58 is configured as a modem that provides modem functionality or an application that provides application functionality, respectively. The main bit file 52 is loaded into the FPGA 40 at power-up by a controller on the FPGA 40 or an external controller either on the circuit board 48 or external to the circuit board 48. The modem bit file 54 and the application bit file 56 are loaded into the FPGA 40 on-demand by a controller on the FPGA 40 or an external controller either on the circuit board 48 or external to the circuit board 48 to provide partial reconfiguration of the FPGA 40, as described below. In this example, the main bit file 52 is loaded into the FPGA 40 on power-up and programs, or configures, the FPGA 40 to include the reconfiguration partition 58, a microprocessor 60, a Partial Reconfiguration Interface (PR IF) 62, a timer 64, SRAM 66 (or other type of volatile memory), an RF interface 68, and a sensor interface 70. Further, in this example, the microprocessor 60 controls on-demand loading of the modem bit file 54 and the application bit file 56 into the reconfiguration partition 58 to provide time-slicing of the modem and application, as described below.

The reconfiguration partition 58 is a subset of the reconfigurable hardware resources of the FPGA 40 allocated for partial reconfiguration. As discussed below, the reconfiguration partition 58 is reconfigured by loading either the modem bit file 54 or the application bit file 56, as described below.

In this example, the microprocessor 60 operates to control on-demand loading of the modem bit file 54 and the application bit file 56 into the reconfiguration partition 58 to provide time-slicing of the modem and application, as described below. The microprocessor 60 receives input (e.g., interrupts) from the timer 64 to trigger partial configuration. The microprocessor 60 configures the reconfiguration partition 58 (i.e., loads a bit file into the reconfiguration partition 58) via the PR IF 62.

The timer 64 is always on and schedules the RF sleep/wake switching so that the wireless communication device 38 can listen to the wireless communication network and transmit/receive data. More specifically, in some embodiments, the wireless communication device 38 wakes up at defined times (e.g., periodically) to transmit and/or receive signals via the RF TX and/or RX circuitry 44. The time periods in which the wireless communication device 38 wakes up to transmit and/or receive signals via the RF TX and/or RX circuitry 44 are referred to herein as transmit and/or receive occasions. The start of a transmit and/or receive occasion, as indicated by the timer 64, is a triggering event that triggers partial reconfiguration of the FPGA 40 by loading the modem bit file 54 into the reconfiguration partition 58 such that the reconfiguration partition 58 operates as a modem that provides modem functionality, rather than an application that provides application functionality. Similarly, the end of a transmit and/or receive occasion is an event that triggers partial reconfiguration of the FPGA 40 by loading the application bit file 56 into the reconfiguration partition 58 such that the reconfiguration partition 58 operates as an application that provides application functionality, rather than a modem that provides modem functionality. In some embodiments, the timer 64 generates interrupt signals to the microprocessor 60 to indicate the start of a transmit and/or receive occasion and the end of the transmit and/or receive occasion. In response to these interrupt signals, the microprocessor 60 loads the appropriate bit files 54 or 56 into the reconfiguration partition 58.

The SRAM 66 is volatile memory used to store data shared between the modem and the application.

The RF interface 68 communicatively couples the reconfiguration partition 58, and in particular the modem when the reconfiguration partition 58 is configured as a modem, to the RF TX and/or RX circuitry 44. In some embodiments, the microprocessor 60 enables the RF interface 68 during transmit and/or receive occasions and otherwise disables the RF interface 68.

The sensor interface 70 communicatively couples the reconfiguration partition 58, and in particular the application when the reconfiguration partition 58 is configured as an application, to one or more sensors 72-1 through 72-N (generally referred to herein individually as sensor 72 and collectively as sensors 72) that are, in this example, external to the circuit board 48. The sensors 72 may include any type(s) of sensor such as, e.g., a temperature sensor(s), a pressure sensor(s), a water sensor(s), a gas sensor(s), etc., and/or the like.

Figure 3:
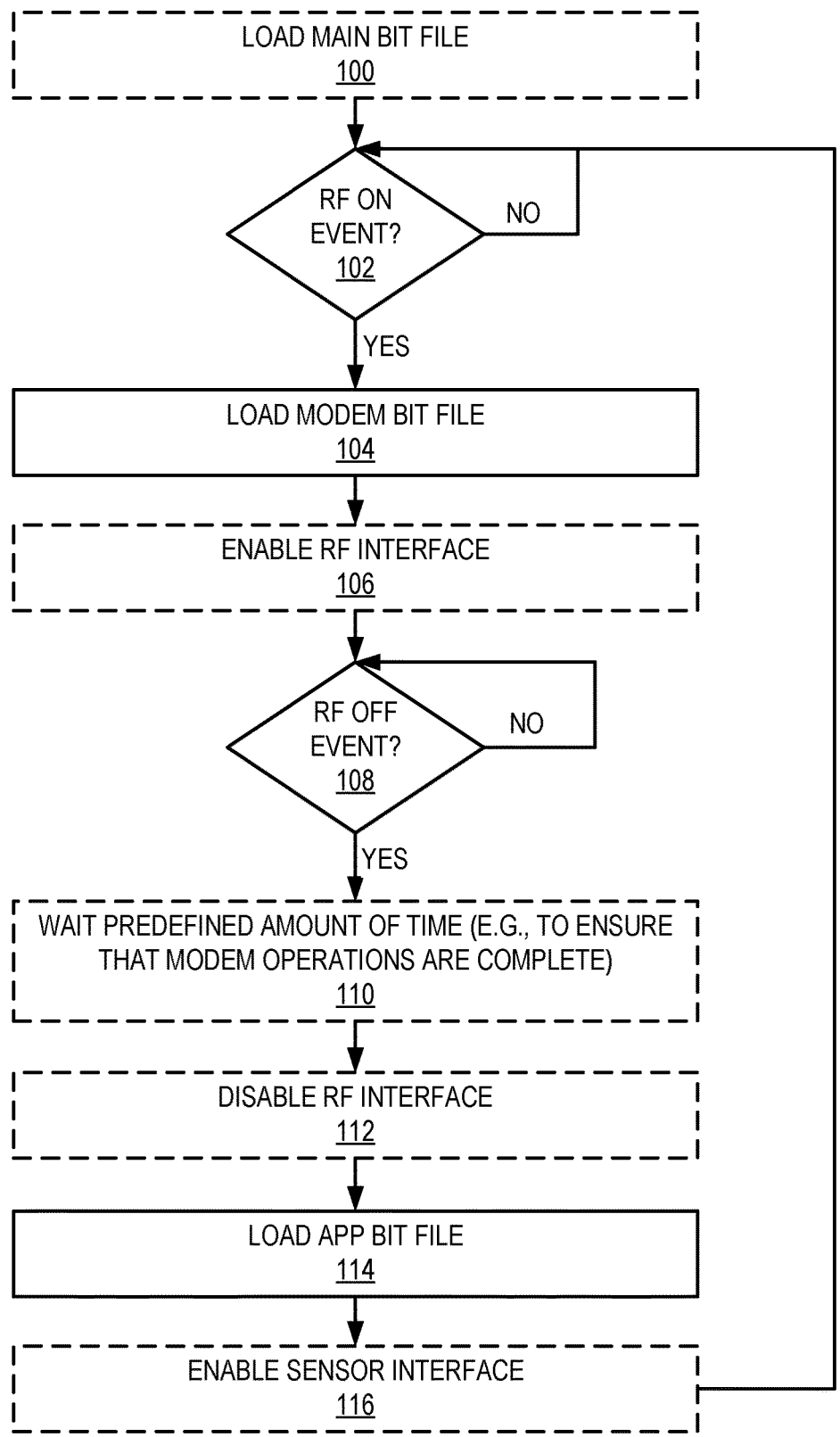
FIG. 3 is a flow chart that illustrates the operation of a controller(s) to control partial reconfiguration of the FPGA of the wireless communication device of FIG. 2 to provide time-slicing between the modem and the application in accordance with some embodiments of the present disclosure.

FIG. 3 is a flow chart that illustrates the operation of a controller(s) to control partial reconfiguration of the FPGA 40 of the wireless communication device 38 to provide time-slicing between the modem and the application in accordance with some embodiments of the present disclosure. Optional steps are indicated with dashed boxes. This process may be performed by a controller on the FPGA 40 (e.g., the microprocessor 60) or by some controller that is external to the FPGA 40 (e.g., a controller in the power and board test block 46) or some combination thereof.

As illustrated, the main bit file 52 is loaded from the non-volatile memory 42 into the FPGA 40 (step 100). In the example of FIG. 2, the main bit file 52 programs, or configures, a subset of the reconfigurable hardware resources of the FPGA 40 to provide the reconfiguration partition 58, the microprocessor 60, the PR IF 62, the timer 64, the SRAM 66 (or other type of volatile memory), the RF interface 68, and the sensor interface 70. A controller (e.g., the microprocessor 60) determines whether an RF ON event has occurred (step 102). The RF ON event is an event that indicates the start of a TX and/or RX occasion of the wireless communication device 38. For example, the RF ON event may be the expiration of a timer having a duration equal to an amount of time between periodic transmit and/or receive occasions for the wireless communication device 38. More specifically, in some embodiments, the timer 64 determines when a TX and/or RX occasion of the wireless communication device 38 is to start (e.g., upon expiration of a corresponding timer) and sends an interrupt to the microprocessor 60 to thereby trigger the microprocessor 60 to perform partial reconfiguration.

Upon detecting an RF ON event, the controller (e.g., the microprocessor 60) loads the modem bit file 54 into the reconfiguration partition 58 of the FPGA 40 via the PR IF 62 (step 104) and, optionally (i.e., in some embodiments), enables the RF interface 68 (step 106). Note that, in some embodiments, both the RF interface 68 and the sensor interface 70 are disabled during partial reconfiguration. In step 106, the RF interface 68 is then enabled after partial reconfiguration is complete.

At this point, the reconfiguration partition 58 of the FPGA 40 is configured as a modem that provides modem functionality. The modem functionality includes, e.g., performing digital baseband processing (e.g., modulation) for signals transmitted via the RF TX and/or RX circuitry 44, performing digital baseband processing (e.g., demodulation) for signals received via the RF TX and/or RX circuitry 44, fetching data output by the application (while the reconfiguration partition 58 was previously configured as an application) from the SRAM 66 and processing the data for, e.g., transmission via the RF TX and/or RX circuitry 44, and/or receive command(s) from, e.g., an IoT server or another IoT device(s) via the RF TX and/or RX circuitry 44 and processing the received command(s).

While the reconfiguration partition 58 is configured as a modem, the controller (e.g., the microprocessor 60) monitors for an RF OFF event (step 108). The RF OFF event is an event that indicates the completion, or end, of the TX and/or RX occasion of the wireless communication device 38. For example, the RF OFF event may be the expiration of a timer having a duration equal to a length (in time) of the TX and/or RX occasion. More specifically, in some embodiments, the timer 64 determines when the TX and/or RX occasion of the wireless communication device 38 is to end (e.g., upon expiration of a corresponding timer) and sends an interrupt to the microprocessor 60 to thereby trigger the microprocessor 60 to perform partial reconfiguration.

Upon detecting an RF OFF event, the controller (e.g., the microprocessor 60) optionally waits for some predefined amount of time, e.g., to ensure that modem operations are complete (step 110), optionally disables the RF interface 68 (step 112), loads the application bit file 56 into the reconfiguration partition 58 of the FPGA 40 via the PR IF 62 (step 114), and optionally enables the sensor interface 70 (step 116).

At this point, the reconfiguration partition 58 of the FPGA 40 is configured as an application that provides application functionality. The application functionality includes, e.g., collecting data from the one or more sensors 72 that are, in this example, external to the circuit board 48, storing the collected data in the SRAM 66, performing data compression for the collected data, performing data cryptography for the collected data, and/or providing the collected data to an external device, e.g., an external display.

The process returns to step 102 and is repeated. Note that, while not illustrated, the SRAM 66 is disabled during partial reconfiguration and enabled after partial reconfiguration is complete (i.e., disabled prior to step 104 and enabled after step 104 is complete and again disabled prior to step 114 and enabled after step 114 is complete). In the example of FIG. 2, the SRAM 66 is enabled and disabled via a respective enable signal (EN_SRAM) provided by the microprocessor 60.

Again, while steps 102 through 116 (and optionally step 100) are performed by the microprocessor 60 on the FPGA 40 in the example of FIG. 2, the present disclosure is not limited thereto. For example, some or all of step 102 through 116 (and optionally 100) may be performed by a controller that is on the circuit board 48 but external to the FPGA 40, by a controller that is external to (i.e., not on) the circuit board 48, or a finite state machine.

Figure 4:
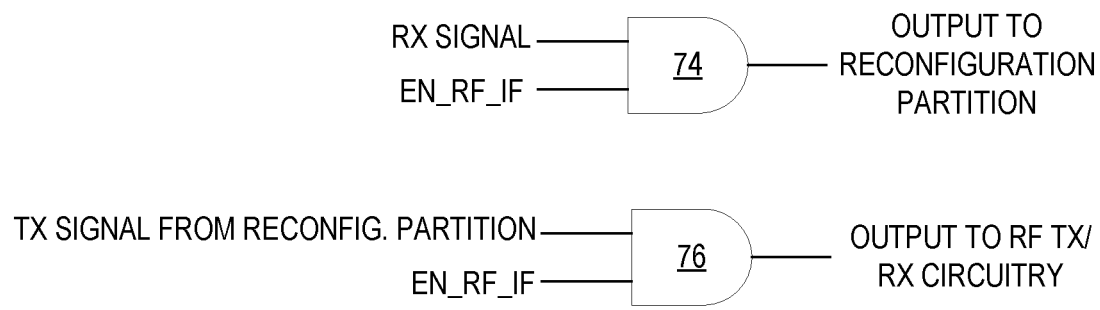
FIG. 4 illustrates one example of the Radio Frequency (RF) interface of the FPGA of the wireless communication device of FIG. 2 that includes a mechanism for enabling and disabling the RF interface according to some embodiments of the present disclosure.
Figure 5:
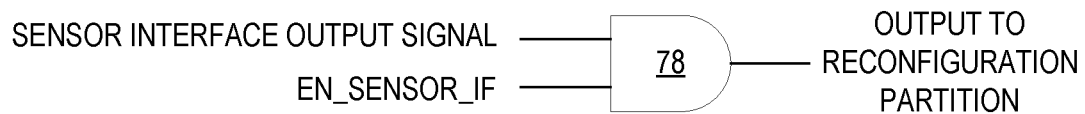
FIG. 5 illustrates one example of the sensor interface of the FPGA of the wireless communication device of FIG. 2 that includes a mechanism for enabling and disabling the sensor interface according to some embodiments of the present disclosure.

FIGS. 4 and 5 illustrate example embodiments of mechanisms with the RF interface 68 and the sensor interface 70 that allow the interfaces 68 and 70, respectively, to be enabled and disabled according to some embodiments of the present disclosure. More specifically, in the example of FIG. 4, the RF interface 68 includes a first AND gate 74 that passes the RX signal from the RF TX and/or RX circuitry 44 to the reconfiguration partition 58 when a respective enable signal (EN_RF_IF) is asserted. The RF interface 68 also includes a second AND gate 76 that passes the TX signal from the reconfiguration partition 58 to the RF TX and/or RX circuitry 44 when the respective enable signal (EN_RF_IF) is asserted. As illustrated in FIG. 5, the sensor interface 70 includes an AND gate 78 that passes a sensor interface output signal to the reconfiguration partition 58 when a respective enable signal (EN_SENSOR_IF) is asserted. The sensor interface output signal is, e.g., a signal that includes data from any one or more of the sensors 72.

The following acronyms are used throughout this disclosure.

5G Fifth Generation
FPGA Field Programmable Gate Array
HDL Hardware Description Language
IoT Internet of Things
MTC Machine Type Communication
PR IF Partial Reconfiguration Interface
RF Radio Frequency
RX Receive
SRAM Static Random Access Memory
TX Transmit Those skilled in the art will recognize improvements and modifications to the embodiments of the present disclosure. All such improvements and modifications are considered within the scope of the concepts disclosed herein and the claims that follow.

What is claimed is:

1. A method for partially reconfiguring a Field Programmable Gate Array, FPGA, that provides processing functionality for a wireless communication device, comprising:
   determining that a first triggering event for partially reconfiguring the FPGA to provide modem functionality has occurred, the modem functionality being functionality related to transmitting and/or receiving signals via a radio frequency transmit and/or receive circuitry that is external to the FPGA;
   upon determining that the first triggering event for partially reconfiguring the FPGA to provide modem functionality has occurred, loading a modem bit file into a reconfiguration partition of the FPGA, the modem bit file programming the reconfiguration partition of the FPGA to provide the modem functionality;
   after loading the modem bit file into the reconfiguration partition of the FPGA, determining that a second triggering event for partially reconfiguring the FPGA to provide application functionality, rather than the modem functionality, has occurred; and
   upon determining that the second triggering event for partially reconfiguring the FPGA to provide application functionality, rather than the modem functionality, has occurred, loading an application bit file into the reconfiguration partition of the FPGA, the application bit file programming the reconfiguration partition of the FPGA to provide the application functionality.

2. The method of claim 1 wherein the wireless communication device periodically transmits and/or receives signals via a wireless communication network, and the first triggering event is an event indicative of a start of a transmit and/or receive occasion of the wireless communication device.

3. The method of claim 2 wherein the second triggering event is an event indicative of completion of the transmit and/or receive occasion of the wireless communication device.

4. The method of claim 1 wherein the wherein the wireless communication device periodically transmits and/or receives signals via a wireless communication network, and the first triggering event is expiration of a timer having a duration equal to an amount of time between transmit and/or receive occasions for the wireless communication device.

5. The method of claim 4 wherein expiration of the timer is indicative of a start of a transmit and/or receive occasion of the wireless communication device, and the second triggering event is an event indicative of completion of the transmit and/or receive occasion of the wireless communication device.

6. The method of claim 1 wherein the application functionality comprises:
functionality to process signals received and stored by the FPGA while the reconfiguration partition was programmed to provide the modem functionality; and/or
functionality to collect data from one more sensors that are external to the FPGA.

7. The method of claim 1 further comprising, upon determining that the first triggering event for partially reconfiguring the FPGA to provide modem functionality has occurred, enabling an interface on the FPGA that communicatively couples the reconfiguration partition of the FPGA to the radio frequency transmit and/or receive circuitry.

8. The method of claim 7 further comprising, upon determining that the second triggering event for partially reconfiguring the FPGA to provide application functionality, rather than the modem functionality, has occurred, disabling the interface on the FPGA that communicatively couples the reconfiguration partition of the FPGA to the radio frequency transmit and/or receive circuitry.

9. The method of claim 1 further comprising, upon determining that the second triggering event for partially reconfiguring the FPGA to provide application functionality, rather than the modem functionality, has occurred, enabling an interface on the FPGA that communicatively couples the reconfiguration partition of the FPGA to one or more external sensors.

10. The method of claim 1 further comprising, upon determining that the second triggering event for partially reconfiguring the FPGA to provide application functionality, rather than the modem functionality, has occurred, waiting a predefined amount of time prior to loading the application bit file into the reconfiguration partition of the FPGA.

11. The method of claim 1 further comprising, prior to determining that the first triggering event for partially reconfiguring the FPGA to provide modem functionality has occurred, loading a main bit file into a main partition of the FPGA that programs the main partition of the FPGA to provide a processor, a timer, memory, an interface to the radio frequency transmit and/or receive circuitry, and an interface to the one or more external sensors.

12. The method of claim 1 wherein the method is performed by one or more components of the FPGA.

13. The method of claim 1 wherein the method is performed by a controller that is external to the FPGA.

14. A wireless communication device for operation in a wireless communication network, comprising:
radio frequency transmit and/or receive circuitry;
one or more sensors;
non-volatile memory storing a modem bit file and an application bit file; and
a Field Programmable Gate Array, FPGA;
wherein a controller is operable to:
determine that a first triggering event for partially reconfiguring the FPGA to provide modem functionality has occurred, the modem functionality being functionality related to transmitting and/or receiving signals via the radio frequency transmit and/or receive circuitry;
upon determining that the first triggering event for partially reconfiguring the FPGA to provide modem functionality has occurred, load the modem bit file from the non-volatile memory into a reconfiguration partition of the FPGA, the modem bit file programming the reconfiguration partition of the FPGA to provide the modem functionality;
after loading the modem bit file into the reconfiguration partition of the FPGA, determine that a second triggering event for partially reconfiguring the FPGA to provide application functionality, rather than the modem functionality, has occurred; and
upon determining that the second triggering event for partially reconfiguring the FPGA to provide application functionality, rather than the modem functionality, has occurred, load the application bit file from the non-volatile memory into the reconfiguration partition of the FPGA, the application bit file programming the reconfiguration partition of the FPGA to provide the application functionality.

15. The wireless communication device of claim 14 wherein:
the non-volatile memory further stores a main bit file; and
the controller is further operable to, prior to determining that the first triggering event for partially reconfiguring the FPGA to provide modem functionality has occurred, load the main bit file into a main partition of the FPGA that programs the main partition of the FPGA to provide memory, an interface to the radio frequency transmit and/or receive circuitry, and an interface to the one or more sensors.

16. The wireless communication device of claim 14 wherein the controller is implemented within the FPGA.

17. The wireless communication device of claim 14 wherein the controller is a component of the wireless communication device and is external to the FPGA.

18. The wireless communication device of claim 14 wherein the wireless communication device periodically transmits and/or receives signals via the wireless communication network, and the first triggering event is an event indicative of a start of a transmit and/or receive occasion of the wireless communication device.

19. The wireless communication device of claim 18 wherein the second triggering event is an event indicative of completion of the transmit and/or receive occasion of the wireless communication device.

20. The wireless communication device of claim 14 wherein the wireless communication device periodically transmits and/or receives signals via the wireless communication network, and the first triggering event is expiration of a timer having a duration equal to an amount of time between transmit and/or receive occasions for the wireless communication device.

21. The wireless communication device of claim 20 wherein expiration of the timer is indicative of a start of a transmit and/or receive occasion of the wireless communication device, and the second triggering event is an event indicative of completion of the transmit and/or receive occasion of the wireless communication device.

22. The wireless communication device of claim 14 wherein the application functionality comprises:
  functionality to process signals received and stored by the FPGA while the reconfiguration partition was programmed to provide the modem functionality; and/or
  functionality to collect data from one more sensors that are external to the FPGA.

23. The wireless communication device of claim 15 wherein the controller is further operable to, upon determining that the first triggering event for partially reconfiguring the FPGA to provide the modem functionality has occurred, enable the interface to the radio frequency transmit and/or receive circuitry.

24. The wireless communication device of claim 23 wherein the controller is further operable to, upon determining that the second triggering event for partially reconfiguring the FPGA to provide application functionality, rather than the modem functionality, has occurred, disable the interface to the radio frequency transmit and/or receive circuitry.

25. The wireless communication device of claim 15 wherein the controller is further operable to, upon determining that the second triggering event for partially reconfiguring the FPGA to provide application functionality, rather than the modem functionality, has occurred, enable the interface to the one or more sensors.

26. The wireless communication device of claim 14 wherein the controller is further operable to, upon determining that the second triggering event for partially reconfiguring the FPGA to provide application functionality, rather than the modem functionality, has occurred, wait a predefined amount of time prior to loading the application bit file into the reconfiguration partition of the FPGA.

* * * * *